(12) United States Patent
Funke

(10) Patent No.: US 7,367,744 B2
(45) Date of Patent: May 6, 2008

(54) STABILIZER BAR SYSTEM FOR AUTOMOTIVE VEHICLE

(75) Inventor: Juergen Funke, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 798 days.

(21) Appl. No.: 10/248,899

(22) Filed: Feb. 28, 2003

(65) Prior Publication Data

US 2003/0175073 A1   Sep. 18, 2003

(30) Foreign Application Priority Data

Mar. 13, 2002   (EP) ................. 02100240

(51) Int. Cl.
*F16D 1/00*   (2006.01)
*B60G 3/02*   (2006.01)
*B60G 11/24*   (2006.01)

(52) U.S. Cl. .............. 403/225; 403/223; 403/228; 280/124.149; 280/124.152; 280/124.165; 280/124.166; 280/124.177

(58) Field of Classification Search ........ 403/220, 403/223, 224, 225, 226, 228, 243, 365; 280/124.13, 280/124.149 X, 124.152 X, 124.165 X, 124.166 X, 280/124.177 X; 464/89; 384/215
See application file for complete search history.

(56) References Cited

U.S. PATENT DOCUMENTS

| | | | | |
|---|---|---|---|---|
| 3,107,953 A | | 10/1963 | Palm | |
| 3,194,614 A | * | 7/1965 | Thomas | |
| 3,608,927 A | * | 9/1971 | Grosseau | |
| 3,746,415 A | * | 7/1973 | Thomson | |
| 4,158,511 A | * | 6/1979 | Herbenar | 403/225 |
| 4,297,787 A | * | 11/1981 | Fischer | |
| 4,327,995 A | * | 5/1982 | Stewart | 403/224 |
| 4,718,210 A | * | 1/1988 | McCourt et al. | |
| 4,854,766 A | | 8/1989 | Hein | |
| 4,916,749 A | * | 4/1990 | Urban et al. | 384/298 |
| 5,820,115 A | * | 10/1998 | Stevenson et al. | 403/226 |
| 6,274,670 B1 | * | 8/2001 | Adedeji et al. | |
| 6,889,988 B2 | * | 5/2005 | Cai et al. | 280/124.107 |

FOREIGN PATENT DOCUMENTS

| | | |
|---|---|---|
| DE | 19912268 | 9/2000 |
| EP | 0747246 | 12/1996 |
| FR | 2768661 | 3/1999 |
| WO | WO 9109748 | 7/1991 |
| WO | WO 9213205 | 8/1992 |

* cited by examiner

*Primary Examiner*—Daniel P. Stodola
*Assistant Examiner*—Victor MacArthur
(74) *Attorney, Agent, or Firm*—Raymond Coppiellie; Dickinson Wright PLLC

(57) ABSTRACT

A stabilizer bar system for an automotive vehicle includes a stabilizer bar having a circular cross section and a rigid sleeve applied to a section of the outer circumference of the stabilizer bar. The sleeve has a number of circumferentially extending grooves and lands which mate with corresponding grooves and lands formed in an inner cylindrical surface of an elastomeric bushing which is overlaid upon the sleeve. The elastomeric bushing and sleeve may be mated such that relative rotation is allowed at the interface of the bushing and sleeve. Alternatively, the bushing and sleeve may be locked so that no relative rotation may occur at the interface of the bushing and sleeve.

7 Claims, 1 Drawing Sheet

STABILIZER BAR SYSTEM FOR AUTOMOTIVE VEHICLE

BACKGROUND OF INVENTION

This application claims the benefit of EPO Patent Application No. EP 02 10 0240, filed Mar. 13, 2002.

1. Field of the Invention

The present invention relates to a composite mounting system for attaching a stabilizer bar to the chassis of an automotive vehicle.

2. Disclosure Information

Laterally extending stabilizer bars have been used for many years with automotive vehicles. Automotive designers have thus been faced continually with the challenge of mounting such bars within bearings which permit limited rotation, while avoiding noise or "clunking" during the useful life of the vehicle, notwithstanding that the underbody of the vehicle is of course subjected to road debris, corrosive deicing agents, vehicle detritus, and other contaminants. Yet another important requirement is that the bearing not be excessively compliant, particularly in radial directions.

As a consequence of the previously mentioned design requirements, as well the period of years for which stabilizer bars have been used on automotive vehicles, designers have employed a variety of hardware solutions with mixed results. Accordingly, after periods of use, some stabilizer bar bearings squeak, and some devices cause clunk. It has been proven to be very illusive to produce a stabilizer bar bearing which performs the required functions as described above without unwanted noise, either squeaking or clunking, and at a reasonable cost and throughout the useful life of the vehicle. Another requirement is that the stabilizer bar bearing have axial integrity to prevent the components of the bearing from separating axially in respond to loads imposed on the bearing by the stabilizer bar itself.

SUMMARY OF INVENTION

A stabilizer bar system for an automotive vehicle includes a stabilizer bar having a circular cross section, and a rigid sleeve applied to a section of the outer circumference of the stabilizer bar, with the sleeve having a generally cylindrical outer surface having a plurality of circumferentially extending grooves and lands formed therein, and with the sleeve being locked to the stabilizer bar. An elastomeric bushing is overlaid upon the sleeve. The elastomeric bushing has an inner generally cylindrical surface with grooves and lands corresponding to the grooves and lands formed in the outer surface of the sleeve. These corresponding grooves and lands assure that the elastomeric bushing is axially locked to the sleeve.

According to another aspect of the present invention, the grooves and lands may be formed continuously such that they will mesh to allow the stabilizer bar and sleeve to rotate with respect to elastomeric bushing. Alternatively, the grooves and lands formed in the sleeve and the grooves and lands formed in the elastomeric bushing may mesh such that the stabilizer bar and sleeve are prevented from rotating with respect to the elastomeric bushing. If relative rotation of the sleeve with respect to elastomeric bushing is not desired, the lands formed on the sleeve may be interrupted so as to define a plurality of teeth extending about a portion of the periphery of the sleeve. And, the elastomeric bushing may have at least one correspondently interrupted land defining a plurality of teeth such that the sleeve and the elastomeric bushing are both axially and rotationally locked.

It is an advantage of the present invention that a stabilizer bar may have a circular cross section with a constant diameter. This imparts strength to the stabilizer bar. Other advantages, as well as objects and features of the present invention, will become apparent to the reader of this specification.

DETAILED DESCRIPTION

Figure 1:
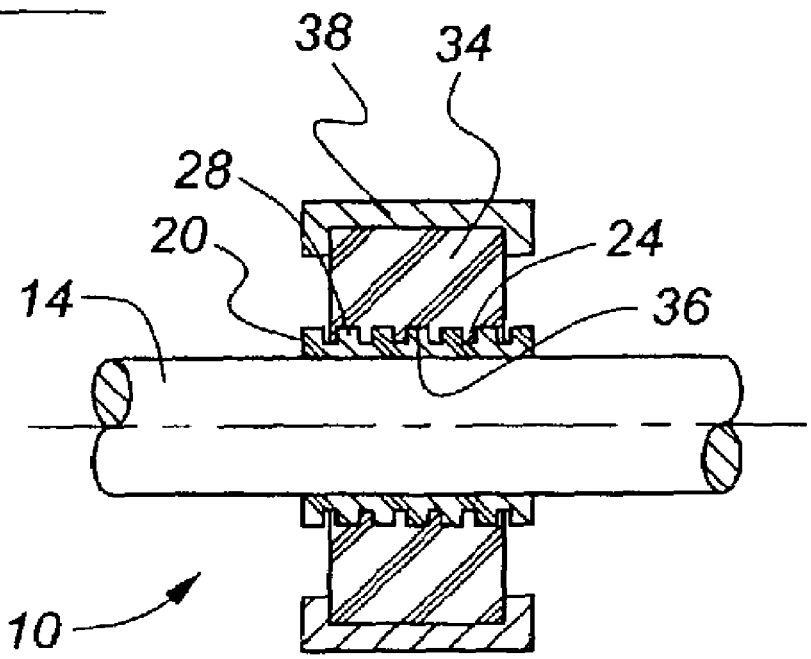
FIG. 1 is a sectional view, partially broken away, of a stabilizer bar system according to the present invention.

As shown in FIG. 1, stabilizer bar system 10 includes stabilizer bar 14 having a circular cross section. Sleeve 20, which preferably comprises resin which is molded in place upon stabilizer bar 14, includes a plurality of grooves 24 which are defined by a plurality of lands 28. Elastomeric bushing 34 has a corresponding number of grooves and lands formed on its generally cylindrical surface 36, so as to allow the elastomeric bushing 34 and sleeve 20 to be axially locked, while still permitting relative rotation at the interface of elastomeric bushing 34 and sleeve 20. A stabilizer bar system according to the present invention may be employed by mounting elastomeric bushing 34 non-rotationally in bracket 38, with the bracket being of a type known to those skilled in the art and customarily utilized for stabilizer bar mounting.

Figure 2:
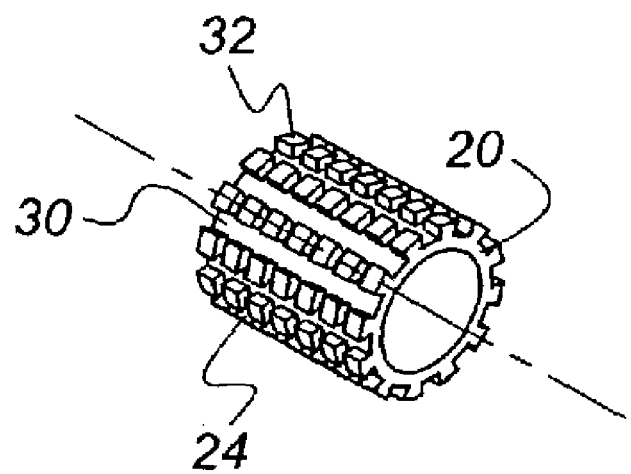
FIG. 2 is a perspective view of a sleeve comprising a portion of a stabilizer bar system according to one aspect of the present invention.

FIG. 2 illustrates a second embodiment of sleeve 20 according to the present invention, in which a plurality of interruptions 30 extend axially across the length of sleeve 20. Together, interruptions 30 and grooves 24 define a plurality of teeth 32 which give rise to a waffle texture on the outer cylindrical surface of sleeve 20. This waffled surface mates with a corresponding waffled surface (not shown) formed on the inner generally cylindrical surface 36 of elastomeric bushing 34. The teeth 32 and corresponding teeth formed in surface 36 of elastomeric bushing 34 allow the present composite mounting system to be both axially and rotationally locked. Rotational locking means that there is no relative movement of sleeve 20 with respect to bushing 34 at their interface. Those skilled in the art will appreciate in view of this disclosure that even with rotational locking, relative rotation of a portion of bushing 34 will occur with respect to the remainder of bushing 34 as bushing 34 "winds up" in response to torque imposed by stabilizer bar 14. Rotational locking may be particularly desirable in certain circumstances, depending upon the characteristics of any vehicle to which the present system is applied. For example, rotational locking of sleeve 20 and elastomeric bushing 34 will prevent any possibility of squeaking resulting from stick/slip motion arising between sleeve 20 and bushing 34, which could be the situation were relative motion to be allowed at the interface of sleeve 20 and bushing 34.

Although the present invention has been described in connection with particular embodiments thereof, it is to be understood that various modifications, alterations, and adaptations may be made by those skilled in the art without departing from the spirit and scope of the invention set forth in the following claims.

The invention claimed is:

1. A stabilizer bar system for stabilizing a chassis of an automotive vehicle, comprising:
   a stabilizer bar having a circular cross section;
   a rigid sleeve applied to a section of the outer circumference of said stabilizer bar, with said sleeve having a generally cylindrical outer surface having a plurality of circumferentially extending grooves and lands formed therein, and with said sleeve being both axially and rotationally locked to said stabilizer bar; and
   an elastomeric bushing overlying said sleeve, with said bushing having an inner generally cylindrical surface with grooves and lands corresponding to the grooves and lands formed in the outer surface of said sleeve, such that said elastomeric bushing is axially locked to said sleeve.

2. A stabilizer bar system according to claim 1, wherein said grooves and lands formed in said sleeve and said grooves and lands formed in said elastomeric bushing are each continuous and mesh such that said stabilizer bar and said sleeve may rotate with respect to said elastomeric bushing.

3. A stabilizer bar system according to claim 1, wherein said grooves and lands formed in said sleeve and said grooves and lands formed in said elastomeric bushing mesh such that said stabilizer bar and said sleeve are prevented from rotating with respect to said elastomeric bushing at the interface of said sleeve and said elastomeric bushing.

4. A stabilizer bar system according to claim 1, wherein at least one of said lands formed on said sleeve is interrupted, so as to define a plurality of teeth extending about a portion of the periphery of said sleeve, with said elastomeric bushing having a at least one correspondingly interrupted land defining a mating plurality of teeth, such that said sleeve and said elastomeric bushing are both axially and rotationally locked.

5. A stabilizer bar system according to claim 1, wherein said sleeve comprises a resin-based material cast in place upon said stabilizer bar.

6. A stabilizer bar system for stabilizing a chassis of an automotive vehicle, comprising:
   a stabilizer bar having a circular cross section;
   a resin-based rigid sleeve both axially and rotationally locked to a section of the outer circumference of said stabilizer bar, with said sleeve having a generally cylindrical outer surface having a plurality of circumferentially extending grooves and lands formed therein, with at least one of said lands formed on said sleeve being interrupted, so as to define a plurality of teeth extending about a portion of the periphery of said sleeve; and
   an elastomeric bushing overlying said sleeve, with said bushing having a generally cylindrical inner surface with grooves and lands corresponding to the grooves and lands formed in the outer surface of said sleeve, and with said elastomeric bushing having a at least one correspondingly interrupted land defining a plurality of teeth interlocking with said teeth defined on said sleeve, such that said sleeve and said elastomeric bushing are both axially and rotationally locked.

7. A stabilizer bar system according to claim 6, further comprising a bracket for mounting said elastomeric bushing to the chassis of an automotive vehicle.

* * * * *